United States Patent
Nagasaki et al.

(10) Patent No.: US 6,863,232 B2
(45) Date of Patent: Mar. 8, 2005

(54) TAPE TENSION CONTROLLING MECHANISM FOR MAGNETIC RECORDING/REPRODUCING APPARATUS

(75) Inventors: Eiji Nagasaki, Osaka (JP); Akio Konishi, Hyogo (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 10/158,248

(22) Filed: May 30, 2002

(65) Prior Publication Data

US 2002/0179761 A1 Dec. 5, 2002

(30) Foreign Application Priority Data

Jun. 4, 2001 (JP) ........................................ 2001-168004

(51) Int. Cl.[7] .............................................. G11B 15/43
(52) U.S. Cl. ................... 242/334.6; 242/343.1
(58) Field of Search ........................... 242/334.6, 343.1, 242/343.2, 353, 355.1, 331.5; 360/55, 92, 93, 96.3

(56) References Cited

U.S. PATENT DOCUMENTS

| | | | | |
|---|---|---|---|---|
| 3,677,496 A | * | 7/1972 | Apitz ........................ 242/343.2 |
| 4,614,315 A | * | 9/1986 | Gerrits et al. ............. 242/334.6 |
| 5,167,380 A | * | 12/1992 | Choi ........................ 242/334.6 |
| 5,625,509 A | * | 4/1997 | Matsuoka ..................... 360/94 |
| 5,772,141 A | * | 6/1998 | Ahn ........................ 242/334.6 |
| 5,772,142 A | * | 6/1998 | Ahn ........................ 242/334.6 |
| 6,286,775 B1 | * | 9/2001 | Hirabayashi et al. ..... 242/334.6 |

* cited by examiner

Primary Examiner—Eileen D. Lillis
Assistant Examiner—Scott J. Haugland
(74) Attorney, Agent, or Firm—Renner, Otto, Boisselle & Sklar, LLP

(57) ABSTRACT

A tape tension controlling mechanism of a magnetic recording/reproducing apparatus for controlling a tension of a magnetic tape includes: a reel bed; a reel bed drum; a tension post; a tension arm rotatably supported by a tension arm shaft; an urging element; a tension band having an engagement portion; and a band fixing screw having a threaded portion at one end thereof and a head portion at the other end, the band fixing screw further having, between the threaded portion and the head portion, an intermediate shaft portion for engagement with the engagement portion of the tension band, wherein a longitudinal center line of the intermediate shaft portion is shifted from the longitudinal center line of the threaded portion, and a pitch P of a thread of the threaded portion and a longitudinal length L of the intermediate shaft portion have a relationship of L>P/2.

5 Claims, 6 Drawing Sheets

(PRIOR ART)

TAPE TENSION CONTROLLING MECHANISM FOR MAGNETIC RECORDING/REPRODUCING APPARATUS

BACKGROUND OF THE INVENTION

1. Field of the Invention

The present invention relates to a tape tension controlling mechanism for use in a magnetic recording/reproducing apparatus, such as a videotape recorder (VTR).

2. Description of the Related Art

In recent years, there has been a growing demand for a decrease in size of magnetic recording/reproduction apparatuses, such as VTRs, camcoders, etc.

A tape tension controlling mechanism for use in a conventional magnetic recording/reproducing apparatus is described below.

As an example of a conventional technique for tape tension control, a mechanism disclosed in Japanese Patent Application No. 10-070169, which is incorporated herein by reference, is described with reference to FIG. 5, which is essentially equivalent to FIG. 15 of Japanese Patent Application No. 10-070169. In FIG. 5, reference numeral 1 denotes a cassette, and reference numeral 2 denotes a tape which is tensionally looped in the cassette 1. The tape 2 is wound around an S-reel (not shown) and a T-reel (not shown) contained in the cassette 1. For the clarity of illustration, only the outline of the cassette 1 and a portion of the tape 2 which is pulled out of the cassette 1 are represented by dashed lines in FIG. 5. The conventional magnetic recording/reproducing apparatus includes an S-reel bed 4 and a T-reel bed 5 which are engaged with, and rotate integrally with, the S-reel and the T-reel of the cassette 1, respectively. A tension arm 12 is rotatably supported by a tension arm shaft 13 mounted on a sub-chassis 3. The tension arm 12 has a tension post 14 at one end thereof, the tension post 14 projecting from a surface of the tension arm 12. Reference numeral 19 denotes a tension band, one end of which is axially supported by a shaft 20 of the tension arm 12. The other end of the tension band 19 is axially supported by a shaft 22 formed on a tension band restriction arm 21. A central portion of the tension band 19 is looped around a cylindrical portion 26 formed along the outer perimeter of the S-reel bed 4. Reference numeral 27 denotes an extension spring, one end of which is fixed to a spring fixing element of the sub-chassis 3. The other end of the extension spring is fixed to the tension arm 12. Accordingly, the tension arm 12 is urged in a counterclockwise direction by rotation about the tension arm shaft 13. The tension band restriction arm 21 is axially supported by a shaft 23 formed on the sub-chassis 3. The tension band restriction arm 21 is urged by a twisted coil spring 24 in a counterclockwise direction by rotation around the shaft 23. The tension band restriction arm 21 abuts a tension arm stoppage plate 116 so that the position of the tension band restriction arm 21 is controlled.

The magnetic tape 2 pulled out from the S-reel of the cassette 1 passes through a portion 2a and is looped around the tension post 14 with a predetermined contact area therebetween which corresponds to a predetermined angular distance of the magnetic tape 2 around the tension post 14. The magnetic tape 2 is looped around tape guide posts 49, 44, and 45, and a cylinder 38 having a rotatable magnetic head for the recording/reproducing of a signal to/from the magnetic tape 2 by running the magnetic tape 2 around a portion thereof.

In the above structure, when the magnetic tape 2 runs for recording or reproduction, frictional force is generated between the tension band 19 and the cylindrical portion 26 of the S-reel bed 4. At the same time, since a rotational moment is caused in the tension post 14 in the clockwise direction due to the tension of the magnetic tape 2, feedback is given to the frictional force so that the tape tension is controlled. Since the tension post 14 is a part of the running system of the magnetic tape 2, the tension post 14 must be accurately positioned. However, without the provision of an adjustment mechanism, it is difficult to accurately position the tension post 14 due to variations in the sizes of the various elements described above. Specifically, examples of the variations in sizes include a variation in the length of the tension band 19, a variation in the diameter of the cylindrical portion 26, a variation in the positions of the tension arm shaft 13 and the shaft 23, a variation in the position of the tension arm stoppage plate 116, etc. In this conventional example, such an adjustment mechanism is provided. Specifically, the tension arm stoppage plate 116 is fixed by a screw (not shown) to the sub-chassis 3 in such a way that the position thereof can be freely adjusted. With such an arrangement, the position of the tension band restriction arm 21 can be adjusted. As a result, by adjusting the length of the tension band 19 and by adjusting the position of the tension arm stoppage plate 116, the position of the tension post 14 can be freely adjusted.

However, the above structure involves the problems described below.

In order to adjust the position of the tension post 14, the following procedure steps are required to be performed. At the first step, the screw which tentatively fixes the tension arm stoppage plate 116 to the sub-chassis 3 is loosened. Then, the position of the tension arm stoppage plate 116 is adjusted thereby adjusting the position of the tension band restriction arm 21 so as to adjust the position of the tension arm 12, such that the tension post 14 is placed at a predetermined position. After the tension post 14 is appropriately placed at the predetermined position, at the last step, the screw is tightened so as to fix the tension arm stoppage plate 116 in place.

That is, the steps of loosening and tightening the screw are required for adjusting the position of the tension post 14. Further, the position of the tension post 14 is merely adjusted by trial-and-error while the screw is loosened, where during tightening the screw it is easy for the tension post 14 to move from the predetermined position, such that accurate positioning of the tension post 14 is not possible. Furthermore, it is necessary to form an external thread of the screw and an internal thread of a portion that receives the screw (these threads are generally formed by a tapping technique). Thus, in the conventional tape tension control mechanism, a large number of components are used; the adjustment performed during an assembly process is complicated and includes many steps; and it is difficult to reduce the size of the entire mechanism because an adjustment mechanism consumes a large space.

SUMMARY OF THE INVENTION

According to one aspect of the present invention, there is provided a tape tension controlling mechanism for controlling a tension of a magnetic tape when the magnetic tape is run for recording or reproduction of a signal thereto or therefrom by a magnetic recording/reproducing apparatus, comprising: a reel bed which engages, and integrally rotates, with a tape reel around which the magnetic tape is wound; a reel bed drum which rotates integrally with the reel bed during recording/reproduction of the magnetic tape; a tension post around which the magnetic tape is looped with a predetermined angular distance; a tension arm including the tension post and rotatably supported by a tension arm shaft; an urging element for rotationally urging the tension arm; a tension band, one end of which is connected to the tension arm, and which has an engagement portion at the other end, the tension band providing a rotational moment to the tension arm in a direction opposite to the rotation direction of the tension arm, such that the magnetic tape is looped around the reel bed drum with a predetermined angular distance; and a band fixing screw for fixing the other end of the tension band, the band fixing screw having a threaded portion at one end thereof and a head portion at the other end for preventing disengagement of the tension band from the band fixing screw, the band fixing screw further having, between the threaded portion and the head portion, an intermediate shaft portion for engagement with the engagement portion of the tension band, wherein a longitudinal center line of the intermediate shaft portion is shifted from the longitudinal center line of the threaded portion, and a pitch P of a thread of the threaded portion and a longitudinal length L of the intermediate shaft portion have a relationship of $L > P/2$.

In one embodiment of the present invention, the threaded portion of the band fixing screw is an external screw thread which is screwed into a threaded resin hole; and the threaded portion and the threaded resin hole have a relationship of $D1 > D2$, where D1 denotes the diameter of a circumcircle of a ridge of the threaded portion, and D2 denotes the diameter of an inscribed circle of the threaded resin hole.

In another embodiment of the present invention, the threaded portion of the band fixing screw is an external screw thread which is screwed into a threaded resin hole; the intermediate shaft portion of the band fixing screw has a cylindrical shape; the external screw thread portion and the intermediate shaft portion have a relationship of $D3 > D1$, where D1 denotes the diameter of a circumcircle of a ridge of the external screw thread portion, and D3 denotes the diameter of the intermediate shaft portion; and the band fixing screw has a smooth surface portion between the intermediate shaft portion and the external screw thread portion.

In still another embodiment of the present invention, a position of the tension post relative to the reel bed drum is defined by a position of the shifted longitudinal center line of the intermediate shaft portion relative to the center line of the threaded portion.

In still another embodiment of the present invention, a prescribed position of the shifted longitudinal center line of the intermediate shaft portion relative to the center line of the threaded portion is maintained by an amount of frictional force generated between the band fixing screw and a resin material of the threaded resin hole.

In still another embodiment of the present invention, a protrusion for supporting the tension band is provided at a predetermined position in the magnetic recording/reproducing apparatus such that the tension band is prevented from moving toward the threaded portion of the band fixing screw even when the longitudinal position of the band fixing screw is shifted by rotating the band fixing screw.

According to tape tension controlling mechanism of the present invention, the position of a tension post can be adjusted by a very simple adjustment mechanism. The number of components of the tape tension controlling mechanism is small. The adjustment performed during an assembly process of the mechanism is readily achieved with a small number of steps. The adjustment mechanism consumes a small space. As a result, the production cost of the magnetic recording/reproducing apparatus of the present invention is decreased and is made compact since the size of the tension controlling mechanism is decreased.

According to the present invention, tightening of a band fixing screw for fixing a position of the tension post is readily achieved in an assembly process of the tape tension controlling mechanism, and the number of assembly steps can be reduced. As a result, the production cost of the magnetic recording/reproducing apparatus of the present invention is reduced, and the quality of the apparatus increases.

According to the present invention, the position of one end of a tension band defining a position of the tension post can be adjusted by rotating the band fixing screw. Thus, the position of the tension post can be adjusted by a very simple mechanism. The number of components of the tension controlling mechanism of the present invention is small, the adjustment performed during an assembly process thereof is readily achieved with a small number of steps, and the adjustment mechanism consumes a small space. As a result, the production cost of the magnetic recording/reproducing apparatus of the present invention is decreased and is made compact since the size of the tension controlling mechanism is decreased.

According to the present invention, the band fixing screw is screwed into a resin hole while the resin hole is deformedly broadened. Thus, the band fixing screw is not undesirably loosened or tightened after the position of a tension post is adjusted to a desired position. Therefore, it is not necessary to provide additional means for preventing loosening of the band fixing screw. As a result, the production cost of the magnetic recording/reproducing apparatus of the present invention is decreased and is made compact since the size of the tension controlling mechanism is decreased.

According to the present invention, when the band fixing screw is screwed into the resin hole, the band fixing screw smoothly extends through an engagement portion of the tension band such that an intermediate shaft portion of the band fixing screw is securely engaged with the engagement portion. Accordingly, tightening of the screw is readily achieved in an assembly process of the tape tension controlling mechanism, and the number of assembly steps can be reduced. As a result, the production cost of the magnetic recording/reproducing apparatus of the present invention is reduced, and the quality of the apparatus increases.

Thus, the invention described herein makes possible the advantages of providing an inexpensive, small sized tension controlling mechanism for use in a magnetic recording/reproducing apparatus, wherein: the position of a tension post can be adjusted by a very simple adjustment mechanism; the number of components of the tape tension controlling mechanism is small; adjustment performed during an assembly process of the tension controlling mechanism is readily achieved with a small number of steps; and the adjustment mechanism consumes a small space.

These and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to FIGS. 1 through 4.

Figure 1:
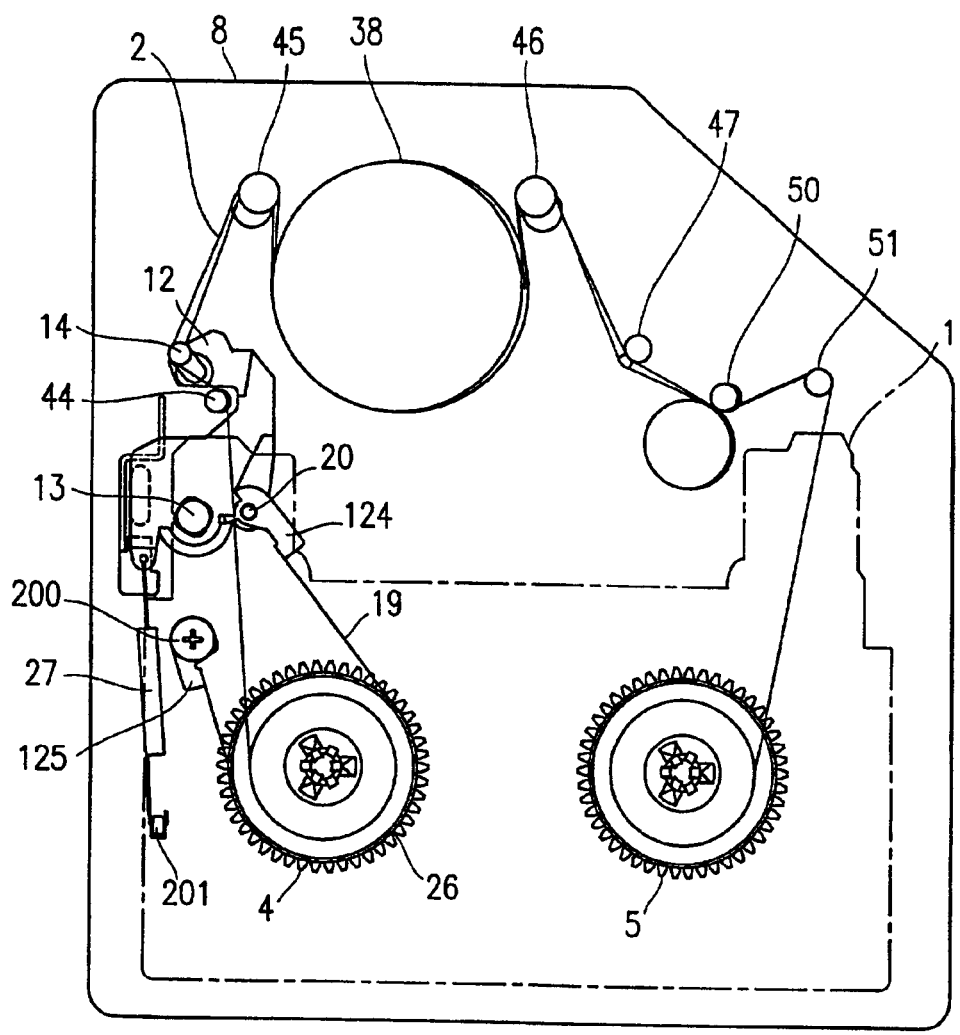
FIG. 1 is a plan view showing a mechanism of a magnetic recording/reproducing apparatus (VTR) including a tape tension controlling mechanism according to embodiment 1 of the present invention.

FIG. 1 is a plan view showing a mechanism of a magnetic recording/reproducing apparatus (VTR) including a tape tension controlling mechanism according to embodiment 1 of the present invention. In FIG. 1, some components of the mechanism of the magnetic recording/reproducing apparatus are omitted for clarity of illustration.

Reference numeral 1 denotes a cassette, and reference numeral 2 denotes a magnetic tape which is tensionally looped in the cassette 1. The tape 2 is wound around two tape reels (not shown) contained in the cassette 1. For the clarity of illustration, only the outline of the cassette 1 is shown by a dashed line. Reference numeral 8 denotes a main chassis for mounting the cassette 1. Reference numerals 4 and 5 denote an S-reel bed and a T-reel bed, respectively, which are rotatably mounted on the main chassis 8. The S-reel bed 4 and T-reel bed 5 are engaged, and rotate integrally, with the tape reels in the cassette 1. Reference numeral 12 denotes a tension arm, which is rotatably supported by a tension arm shaft 13 mounted on the main chassis 8. The tension arm 12 has a tension post 14 formed at one end thereof. The magnetic tape 2 is looped around the tension post 14 with a predetermined contact area therebetween which corresponds to a predetermined angular distance of the magnetic tape 2 around the tension post 14.

Figure 2:
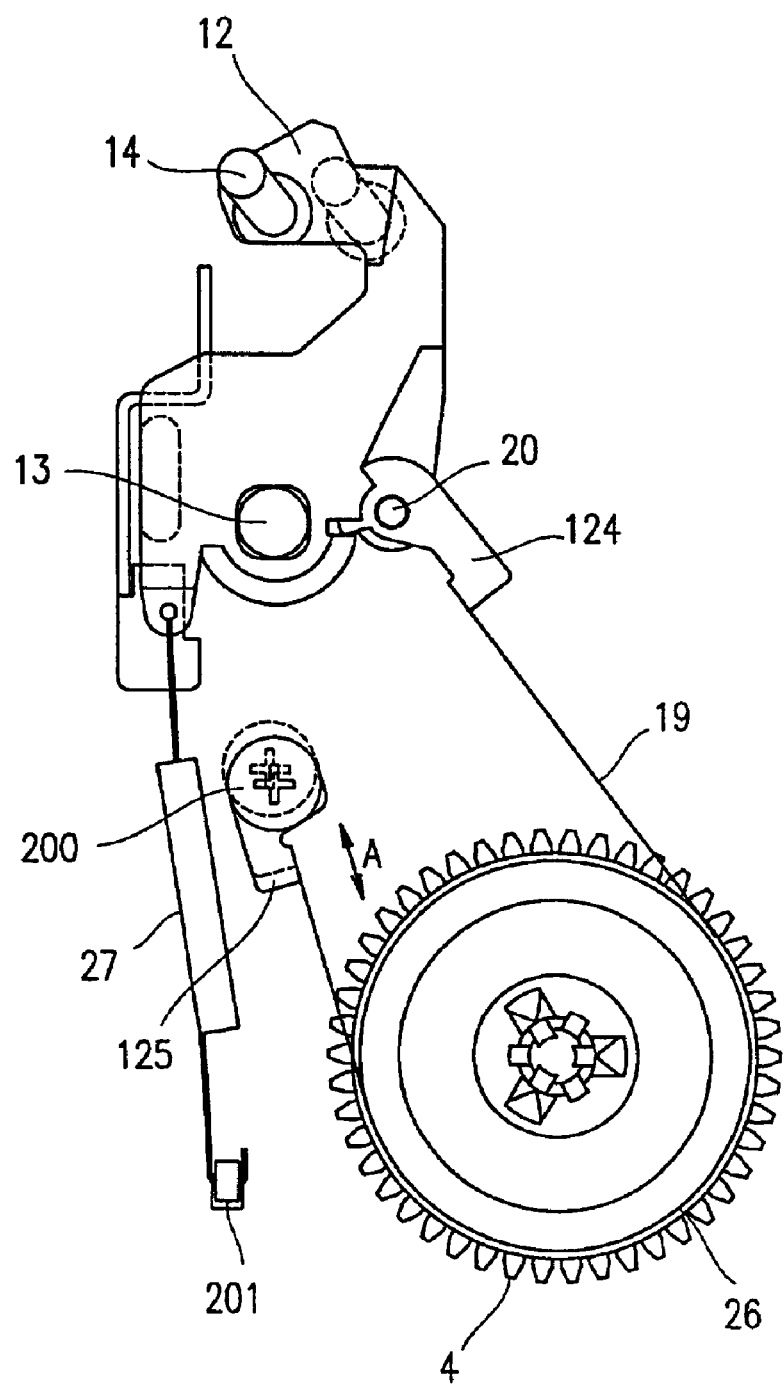
FIG. 2 shows in detail a tension arm and components in the vicinity thereof according to embodiment 1.

FIG. 2 shows in detail the tension arm 12 and components in the vicinity thereof. Operation of these components is described below with reference to FIGS. 1 and 2.

The tension arm 12 connected to one end of an extension spring 27 is rotationally urged by the extension spring 27 (urging element) in a counterclockwise direction. The other end of the extension spring 27 is fixed to a spring fixing element 201 formed on the main chassis 8. Reference numeral 19 denotes a tension band. The tension band 19 is looped around a reel bed drum 26 which rotates integrally with the S-reel bed 4 during recording/reproduction of a signal to/from the magnetic tape 2. One end, denoted by reference numeral 124, of the tension band 19 is axially supported by a shaft 20 provided on the tension arm 12. The tension band 19 gives a rotational moment to the tension arm 12 in a clockwise direction (i.e., in a direction opposite the rotation direction of the tension arm 12), thereby looping the magnetic tape 2 around the reel bed drum 26 with a predetermined angular direction. The other end, denoted by reference numeral 125, of the tension band 19 is attached to a main body of the magnetic recording/reproducing apparatus (see FIG. 3) with a band fixing screw 200.

Figure 3A:
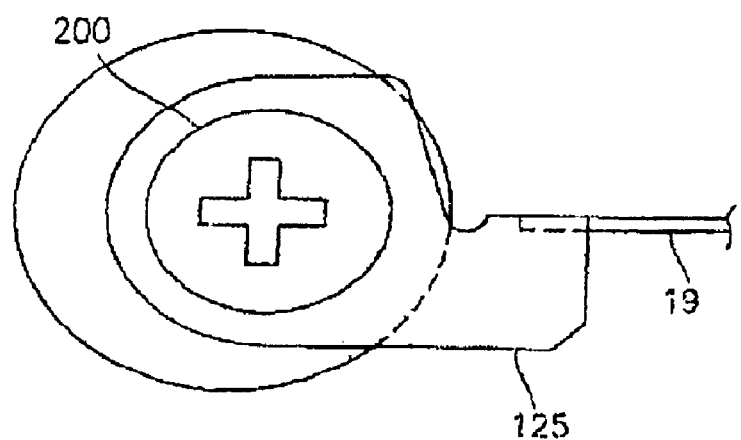
FIGS. 3A(a) and 3A(b) show a top view and a cross-sectional view, respectively, of a band fixing screw and components in the vicinity thereof according to embodiment 1 before they are rotated.
Figure 3A:
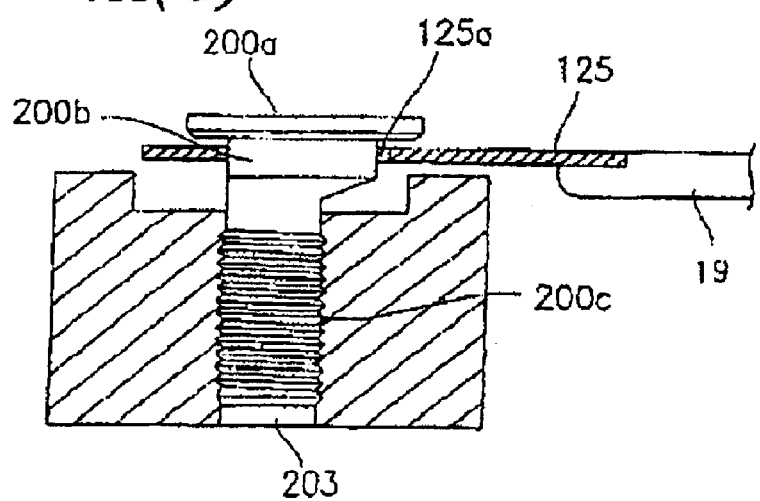
Figure 3B:
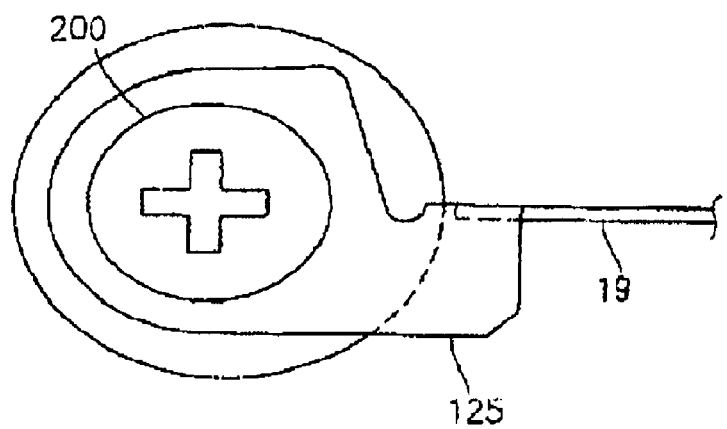
FIGS. 3B(a) and 3B(b) show a top view and a cross-sectional view, respectively, of a band fixing screw and components in the vicinity thereof according to embodiment 1 after they have been rotated by 180°.
Figure 3B:
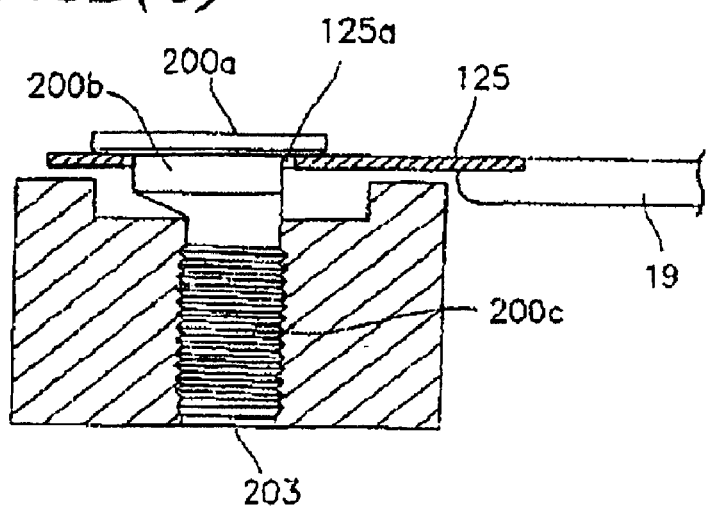
Figure 4:
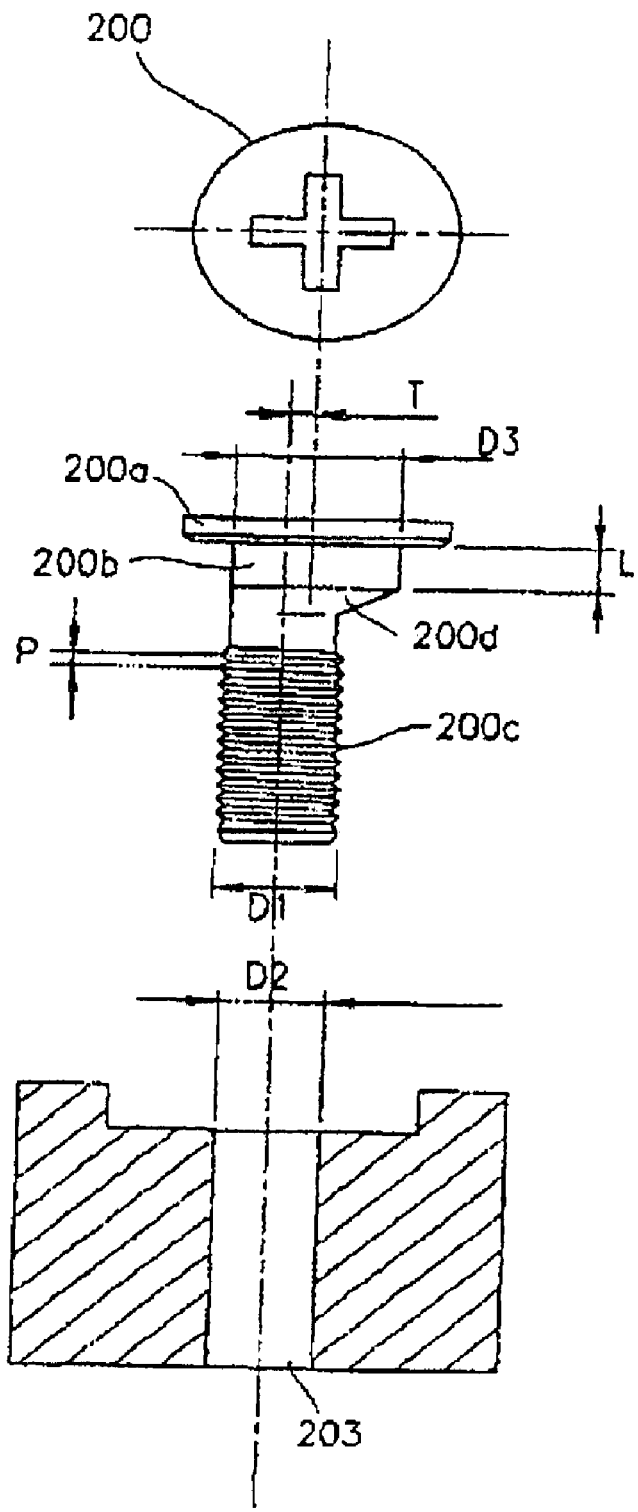
FIG. 4 shows a top view and a cross-sectional view of a band fixing screw and components in the vicinity thereof according to embodiment 1.
Figure 5:
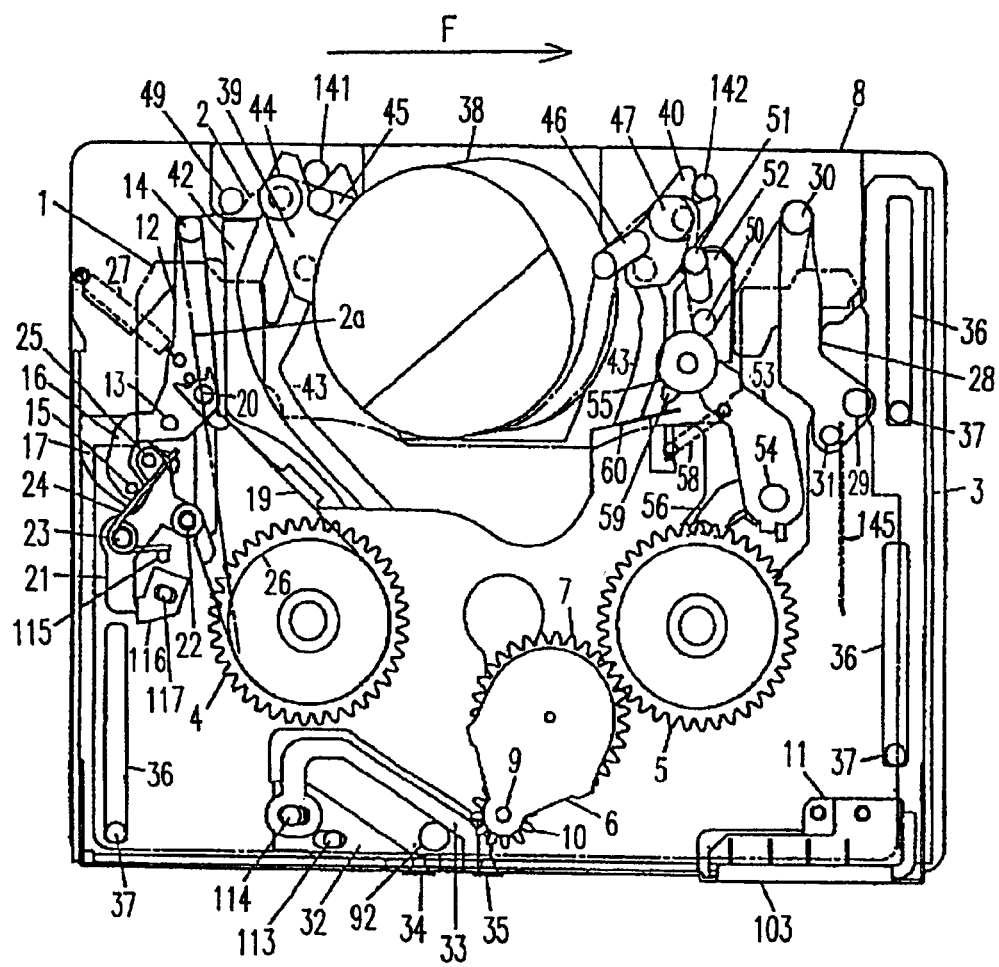
FIG. 5 shows a cassette housing portion of a conventional magnetic recording/reproducing apparatus.

FIGS. 3A(a)–3A(b) and 3B(a)–3B(b) show the band fixing screw 200 and components in the vicinity thereof in a top view and a cross-sectional view. As shown in FIGS. 3A(a)–3A(b) and 3B(a)–3B(b), the band fixing screw 200 penetrates through an engagement portion 125a of the tension and 19 at the end 125 of the tension band 19, and is screwed into an unthreaded resin hole 203 formed in the main body of the magnetic recording/reproducing apparatus. FIG. 4 shows the specific details of the band fixing screw 200 and the unthreaded resin hole 203.

In FIGS. 3A(a)–3A(b), 3B(a)–3B(b), and 4, the band fixing screw 200 has a threaded portion 200c at one end thereof, and has a head portion 200a at the other end for preventing disengagement of the tension band 19 from the band fixing screw 200. The band fixing screw 200 has an intermediate shaft portion 200b having a cylindrical shape below the head portion 200a for penetrating through and engaging with the engagement portion 125a. Further, the band fixing screw 200 has a tapered portion 200d which smoothly extends between the intermediate shaft portion 200b and the threaded portion 200c which have different diameters. The threaded portion 200a has an external thread formed at a pitch P. The longitudinal length of the intermediate shaft portion 200b is L. The pitch P of the external thread and the longitudinal length L of the intermediate shaft portion 200b have a relationship of L>P/2. The longitudinal center line of the intermediate shaft portion 200b is shifted (offset) from the longitudinal center line of the threaded portion 200a by distance T. In such a structure, by changing the depth of the band fixing screw 200 in the main body by rotating the band fixing screw 200, the tension band 19 is moved along the direction indicated by arrow A of FIG. 2 such that the tension post 14 is adjusted to be placed at a desired tape pass position. That is, by screwing the band fixing screw 200 further into the main body, the shifted longitudinal center line of the intermediate shaft portion 200b is rotated about the longitudinal center line of the threaded portion 200c, thereby moving the band fixing screw 200 and thus the engagement portion 125a of the end 125 of the tension band 19 in the direction of arrow A (i.e., shown in FIG. 2 as the dashed fixing screw 200 and end 125). Comparing FIGS. 3A(a)–3A(b) and 3B(a)–3B(b), it is appreciated that the tension band 19 is moved by rotating the band fixing screw 200.

In an adjustment process using this eccentricity of the band fixing screw 200, the difference in the phase angle of the band fixing screw 200 between the right most position and the left most position of the tension post 14 is 180° at a minimum (i.e., the full dynamic range of positions of the tension post 14 is limited). Thus, it is desirable that the band fixing screw 200 is surely rotatable in an angular range of at least about 180° (i.e., half a complete turn) for adjustment. This is ensured by setting an appropriate length of the tapered position 200d.

When the band fixing screw 200 is rotated by 180°, the band fixing screw 200 moves in a vertical direction by P/2. Thus, if the longitudinal length L of the intermediate shaft portion 200b is equal to or smaller than P/2, the engagement portion 125a may be disengaged from the intermediate shaft portion 200b. Therefore, in order to securely engage the engagement portion 125a with the intermediate shaft portion 200b, the band fixing screw 200 is designed such that the relationship of L>P/2 is satisfied.

Further, the threaded portion 200c and the resin hole 203 are designed such that a relationship of D1>D2 is satisfied, where D1 denotes the diameter of a circumcircle of a ridge of the threaded portion 200c, and D2 denotes the diameter of an inscribed circle of the resin hole 203. When the threaded portion 200c is screwed into the resin hole 203, the inner wall of the resin hole 203 is deformed so as to conform to the external shape of the threaded portion 200c. In such a state, the band fixing screw 200 cannot be rotated without applying a torque greater than a predetermined torque defined by a resin material used for forming the resin hole 203, because a frictional force is generated between the outer surface of the threaded portion 200c and the inner surface of the resin hole 203. Thus, undesired loosening or tightening of the band fixing screw 200 is prevented such that the prescribed depth of the band fixing screw 200 in the resin hole 203 for accurately providing a desired position of the tension post 14 is maintained.

The band fixing screw 200 is also designed such that a relationship D3>D1 is satisfied, where D3 denotes the diameter of the intermediate shaft portion 200b. Furthermore, the tapered portion 200d smoothly extends between the intermediate shaft portion 200b which has the diameter D3 and the threaded portion 200c which has the diameter D1. Due to such a structure, when the band fixing screw 200 is screwed into the resin hole 203, the band fixing screw 200 smoothly extends through the engagement portion 125a which has a diameter larger than the diameter D3 of the intermediate shaft portion 200b and smaller than a diameter of the head portion 200a, and the intermediate shaft portion 200b is securely engaged with the engagement portion 125a as shown in FIGS. 3A(a)–3A(b) and 3B(a)–3B(b).

The tape running system shown in FIG. 1 is now described. The magnetic tape 2 pulled out from a tape supply reel (not shown), which is located at the left side of the cassette 1, is first looped around an S2-post 44 formed on the main chassis 8, and then looped around the tension post 14. The magnetic tape 2 is further looped around an S1-post 45, a cylinder 38, a T1-post 46, a T2-post 47, and a capstan 50. Thereafter, the magnetic tape 2 is looped around a T3-post 51, and is wound around an enwinding reel (not shown) located in the right side of the cassette 1.

When the magnetic tape 2 runs around the cylinder 38 for recording or reproducing of a signal thereto/therefrom by the magnetic recording/reproducing apparatus, frictional force is generated between the tension band 19 and the reel bed drum 26. At the same time, since a rotational moment is caused in the tension post 14 in the clockwise direction due to the tension of the magnetic tape 2, feedback is given to the frictional force so that the magnetic tape 2 runs with a stable tape tension. Such stable tape tension is maintained by accurately positioning the tension post 14.

As described above, according to the present invention, the position of one end of the tension band can be accurately adjusted by rotating the band fixing screw. Thus, the accurate positioning of the tension post can be adjusted by a very simple mechanism. Further, the number of components of the tension controlling mechanism is small, the adjustment performed during an assembly process is readily achieved with a small number of steps, and the adjustment mechanism consumes a small space. As a result, the production cost of the magnetic recording/reproducing apparatus of the present invention is decreased and is made compact since the size of the tension controlling mechanism is decreased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape tension controlling mechanism for controlling a tension of a magnetic tape when the magnetic tape is run for recording or reproduction of a signal thereto or therefrom by a magnetic recording/reproducing apparatus, comprising:

a reel bed which engages, and integrally rotates, with a tape reel around which the magnetic tape is wound;

a reel bed drum which rotates integrally with the reel bed during recording/reproduction of the magnetic tape;

a tension post around which the magnetic tape is looped with a predetermined angular distance;

a tension arm including the tension post and rotatably supported by a tension arm shaft;

an urging element for rotationally urging the tension arm in a rotation direction;

a tension band, one end of which is connected to the tension arm, and which has an engagement portion at the other end, the tension band providing a rotational moment to the tension arm in a direction opposite to the rotation direction of the tension arm, such that the magnetic tape is looped around the tension post with a predetermined angular distance; and a band fixing screw for fixing the other end of the tension band, the band fixing screw having a threaded portion at one end thereof and a head portion at the other end for preventing disengagement of the tension band from the band fixing screw, the band fixing screw further having, between the threaded portion and the head portion, an intermediate shaft portion for engagement with the engagement portion of the tension band, and a tapered portion smoothly extending between the intermediate shaft portion and the threaded portion;

wherein a longitudinal center line of the intermediate shaft portion is shifted from the longitudinal center line of the threaded portion, a pitch P of a thread of the threaded portion and a longitudinal length L of the intermediate shaft portion have a relationship of L>P/2, the threaded portion of the band fixing screw is an external screw thread which is screwed into an unthreaded resin hole;

the threaded portion and the unthreaded resin hole have a relationship of D1>D2, where D1 denotes the diameter of a circumcircle of a ridge of the threaded portion, and D2 denotes the diameter of an inscribed circle of the unthreaded resin hole; and the tapered portion, as the band fixing screw is screwed into the unthreaded resin hole, smoothly extends through the engagement portion allowing the intermediate shaft portion to be securely engaged with the engagement portion.

2. A tape tension controlling mechanism according to claim 1, wherein:

the intermediate shaft portion of the band fixing screw has a cylindrical shape;

the external screw thread portion and the intermediate shaft portion have a relationship of D3>D1, where D1 denotes the diameter of a circumcircle of a ridge of the external screw thread portion, and D3 denotes the diameter of the intermediate shaft portion; and the tapered portion of the band fixing screw has a smooth surface portion between the intermediate shaft portion and the external screw thread portion.

3. A tape tension controlling mechanism according to claim 1, wherein a position of the tension post relative to the reel bed drum is defined by a position of the shifted longitudinal center line of the intermediate shaft portion relative to the center line of the threaded portion.

4. A tape tension controlling mechanism according to claim 1, wherein a prescribed position of the shifted longitudinal center line of the intermediate shaft portion relative to the center line of the threaded portion is maintained by an amount of frictional force generated between the band fixing screw and a resin material of the unthreaded resin hole.

5. A tape tension controlling mechanism according to claim 1, wherein a protrusion for supporting the tension band is provided at a predetermined position in the magnetic recording/reproducing apparatus such that the tension band is restricted in its movement toward the threaded portion of the band fixing screw even when the longitudinal position of the band fixing screw is shifted by rotating the band fixing screw.

* * * * *